US010465307B2

United States Patent
Pain et al.

(10) Patent No.: US 10,465,307 B2
(45) Date of Patent: *Nov. 5, 2019

(54) APPARATUS FOR ELECTROCHEMICAL ADDITIVE MANUFACTURING

(71) Applicant: Fabric8Labs, Inc., Berkeley, CA (US)

(72) Inventors: David Forrest Pain, San Diego, CA (US); David Morgan Wirth, Huber Heights, OH (US); Jeffrey William Herman, Berkeley, CA (US)

(73) Assignee: Fabric8Labs, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,210

(22) Filed: Nov. 18, 2016

(65) Prior Publication Data
US 2017/0145578 A1 May 25, 2017

Related U.S. Application Data

(60) Provisional application No. 62/257,333, filed on Nov. 19, 2015.

(51) Int. Cl.
| | |
|---|---|
| *C25D 1/00* | (2006.01) |
| *B33Y 10/00* | (2015.01) |
| *B33Y 30/00* | (2015.01) |
| *B33Y 50/02* | (2015.01) |
| *B33Y 70/00* | (2015.01) |
| *C25D 3/12* | (2006.01) |

(Continued)

(52) U.S. Cl.
CPC .............. *C25D 1/003* (2013.01); *B33Y 10/00* (2014.12); *B33Y 30/00* (2014.12); *B33Y 50/02* (2014.12); *B33Y 70/00* (2014.12); *C25D 3/12* (2013.01); *C25D 3/20* (2013.01); *C25D 3/22* (2013.01); *C25D 3/24* (2013.01); *C25D 3/38* (2013.01); *C25D 3/40* (2013.01); *C25D 3/44* (2013.01); *C25D 3/46* (2013.01); *C25D 5/04* (2013.01); *C25D 5/10* (2013.01); *C25D 9/02* (2013.01); *C25D 17/12* (2013.01); *C25D 21/12* (2013.01)

(58) Field of Classification Search
None
See application file for complete search history.

(56) References Cited

U.S. PATENT DOCUMENTS

| 4,575,330 A | 3/1986 | Hull |
| 4,828,654 A | 5/1989 | Reed |

(Continued)

FOREIGN PATENT DOCUMENTS

CN 104178782 A 12/2014

OTHER PUBLICATIONS

Full Machine Translation of Hu et al—CN 104178782 A, obtained at http://worldwide.espacenet.com on Jun. 14, 2019 (Year: 2014).*

(Continued)

*Primary Examiner* — Harry D Wilkins, III
(74) *Attorney, Agent, or Firm* — Dergosits & Noah LLP

(57) ABSTRACT

An apparatus for stereo-electrochemical deposition of metal layers consisting of an array of anodes, a cathode, a positioning system, a fluid handling system for an electrolytic solution, communications circuitry, control circuitry and software control. The anodes are electrically operated to promote deposition of metal layers in any combination on the cathode to fabricate a structure.

20 Claims, 11 Drawing Sheets

(51) Int. Cl.

| | | |
|---|---|---|
| C25D 3/20 | (2006.01) | |
| C25D 3/24 | (2006.01) | |
| C25D 3/40 | (2006.01) | |
| C25D 3/44 | (2006.01) | |
| C25D 3/46 | (2006.01) | |
| C25D 5/04 | (2006.01) | |
| C25D 5/10 | (2006.01) | |
| C25D 9/02 | (2006.01) | |
| C25D 21/12 | (2006.01) | |
| C25D 3/22 | (2006.01) | |
| C25D 3/38 | (2006.01) | |
| C25D 17/12 | (2006.01) | |

(56) References Cited

U.S. PATENT DOCUMENTS

| | | |
|---|---|---|
| 5,173,168 A | 12/1992 | Van Haastrecht et al. |
| 5,403,460 A * | 4/1995 | Sala .................. C25D 3/12 204/252 |
| 5,435,902 A | 7/1995 | Andre, Sr. |
| 5,641,391 A | 6/1997 | Hunter et al. |
| 6,221,230 B1 | 4/2001 | Takeuchi et al. |
| 7,655,126 B2 | 2/2010 | Luo |
| 7,790,009 B2 | 9/2010 | Moller et al. |
| 9,593,431 B2 | 3/2017 | Ramarajan et al. |
| 2002/0098332 A1 | 7/2002 | Warren et al. |
| 2004/0129573 A1 | 7/2004 | Cohen |
| 2004/0134788 A1 | 7/2004 | Cohen et al. |
| 2004/0154828 A1 | 8/2004 | Moller et al. |
| 2005/0045252 A1 | 3/2005 | Yamasaki |
| 2006/0283539 A1* | 12/2006 | Slafer .................. B05D 1/28 156/230 |
| 2007/0068819 A1 | 3/2007 | Singh |
| 2010/0300886 A1 | 12/2010 | Lin |

OTHER PUBLICATIONS

Non-Final Office Action dated Mar. 17, 2017 for U.S. Appl. No. 15/415,246.
Bandyopadhyay et al., "Application of Laser Engineered Net Shaping (LENS) to manufacture porous and functionally graded structures for load bearing implants," J Mater Sci: Mater Med (2009) 20:S29-S34.
Guo et al., "Additive manufacturing: technology, applications and research needs," Front. Mech. Eng. (2013), pp. 1-8.
The Bridge, Linking Engineering and Society, (Spring 2012), Frontiers of Engineering, National Academy of Engineering of the National Academies, 88 pgs.
Vaezi et al., "A review on 3D micro-additive manufacturing technologies," Int. J. Adv. Manuf Technol (2013) 62:1721-1754.
Paul et al., "Effect of Thermal Deformation on Part Errors in Metal Powder Based Additive Manufacturing Process," Journal of Manufacturing Science and Engineering (Jun. 2014), vol. 136, pp. 1-13.
Edwards e al., "Electron Beam Additive Manufacturing of Titanium Components: Properties and Performance," Journal of Manufacturing Science and Engineering, (Dec. 2013), vol. 135, pp. 1-8.
Sundaram et al., "Mask-Less Electrochemical Additive Manufacturing: A Feasibility Study," Journal of Manufacturing Science and Engineering, (Apr. 2015), vol. 137, pp. 1-7.
Kadekar et al., "Deposition Technologies for Micromanufacturing: A Review," Journal of Manufacturing Science and Engineering, (Nov. 2004), vol. 126, pp. 787-795.
Tallman et al., "Direct Electrodeposition of Polypyrrole on Aluminum and Aluminum Alloy by Electron Transfer Mediation," Journal of Electrochemical Society, (2002), 149(3), pp. C173-C179.

Ding et al., "Research and Application of CNT Composite Electroplating," www.intechopen.com, pp. 1-31.
Madden, et al., "Three-Dimensonal Microfabrication by Localized Electrochemical Deposition," Journal of Microelectromechanical Systems, vol. 5, No. 1 (Mar. 1996), pp. 24-32.
El-Giar et al., "Localized Electrochemical Deposition of Copper Microstructures," Journal of the Electrochemical Society, (2000), 147(2), pp. 586-591.
Jansson et al., "HighResolution ED Mcrosructures Made by Localized Electrodepositions of Nickel," Journal of the Eectrochemical Society, (2000) 147(5), pp. 1810-1817.
Yeo et al., "Effects of rotor electrode in the fabrication of high aspect ratio microstructures by localized electrochemical deposition," J. Micromech. Microeng. 11 (2001) 435-442.
Lin et al., "Fabrication of a micrometer Ni—Cu alloy column coupled with a Cu micro-column for thermal measurement," J. Micromech. Microeng. 19 (2009) 015030 (10pp).
Regenfuss et al, "Principles of laser micro sintering," Rapid Protyping Journal 13/4 (2007) pp. 204-212.
Derby et al., "Inkjet Printing of Highly Loaded Particulate Suspensions," www.mrs.org/publications/bulletin, MRS Bulletin (Nov. 2003), pp. 815-818.
Wang et al. "Precision Extruding Deposition and Characterization of Cellular Poly-ϵ-Caprolactone Tissue Scaffolds," Submitted to: 2003 SFF Symposium Sun, et al, Jul. 14, 2003, pp. 573-584.
Lin et al., "Improved Copper Microcolumn Fabricated by Localized Electrochemical Deposition," Electrochemical and Solid-State Letters, (2005), pp. C125-C129.
"Localized electrochemical deposition process improvement by using different anodes and deposition directions," J. Micromech. Microeng. 18(2008) 8 pages.
Said, "Adaptive Tip-Withdrawal Control for Reliable Microfabrication by Localized Electrodeposition," Journal of Microelectromechanical Systems, vol. 13, No. 5, (Oct. 2004), pp. 822-832.
Chang et al., "Surface and transverse morphology of micrometer nickel columns fabricated by localized electrochemical deposition," J. Micromech. Microeng. 17 (2007), pp. 2336-2343.
Lin et al., "Localized electrochemical deposition of micrometer copper columns by pulse plating," Electrochimica Acta 55 (2010), pp. 1888-1894.
Habib et al., "Fabrication of complex shape electrodes by localized electrochemical deposition," Journal of Materials Processing Technology 209 (2009), pp. 4453-4458.
Dini et al., "Electrodeposition of Copper," Modern Electroplating, (2010), pp. 33-78.
Kamaraj et al., "Numerical Study of Localized Electrochemical Deposition for Micro Electrochemical Additive Manufacturing," Procedia CIRP 42 ( 2016 ), pp. 788-792.
Gewirth et al., Fabrication and characterization of microtips for in situ scanning tunneling microscopy, Journal of Electroanalytical Chemistry, vol. 261, Issue 2, Part 2, Apr. 1989, pp. 477-482.
Brant et al., Finite Element Simulation of Localized Electrochemical Deposition for Maskless Electrochemical Additive Manufacturing, Journal of Manufacturing Science and Engineering, vol. 137, Issue 1, Nov. 2014, pp. 0011018-1 to 0011018-9.
Braun et al., The Emerging Role of Electrodeposition in Additive Manufacturing, the Electrochemical Society Interface, vol. 25, Issue 1, Spring 2016 (no month available), pp. 69-73.
International Search Report and Written Opinion dated Feb. 6, 2017 for PCT application No. PCT/US16/62910.
Communication and European Supplementary Search Report, Application No. EP 16867283, dated Mar. 28, 2019, 11 pages.
Espacenet Bibliographic data, English Translation Abstract of CN104178782, 1 page.

* cited by examiner

APPARATUS FOR ELECTROCHEMICAL ADDITIVE MANUFACTURING

CROSS REFERENCE TO RELATED APPLICATIONS

This application claims priority to U.S. Provisional Patent Application No. 62/257,333, entitled "Apparatus for Production of Three-Dimensional Metal Objects by Stereo-Electrochemical Deposition", filed on Nov. 19, 2015, fully incorporated by reference herein.

TECHNICAL FIELD

The present disclosure relates to an apparatus, a system and a method for electrically depositing conductive material from a metal salt solution (hereinafter referred to as an electrolyte or ionic solution) on the cathode to form multiple layers using a two-dimensional array of anodes to fabricate large three dimensional metal structures.

BACKGROUND

Additive manufacturing, also known as 3D Printing, is used for the production of complex structural and functional parts via a layer-by-layer process, directly from computer generated CAD (computer aided drafting) models. Additive manufacturing processes are considered additive because conductive materials are selectively deposited on a substrate to construct the product. Additive manufacturing processes are also considered layered meaning that each surface of the product to be produced is fabricated sequentially.

Together, these two properties mean that additive manufacturing processes are subject to very different constraints than traditional material removal-based manufacturing. Multiple materials can be combined, allowing functionally graded material properties. Complicated product geometries are achievable, and mating parts and fully assembled mechanisms can be fabricated in a single step. New features, parts, and even assembled components can be "grown" directly on already completed objects, suggesting the possibility of using additive manufacturing processes for the repair and physical adaptation of existing products. Structural and functional parts created by additive manufacturing processes have numerous applications in several fields including the biomedical and aerospace industries. Traditional milling and welding techniques do not have the spatial resolution to create complex structural parts that can be achieved through additive manufacturing However, electrochemical additive manufacturing (ECAM) techniques in general have several limitations such as choice of material, porosity, strength, scalability, part errors, and internal stresses. A deposition process must be developed and tuned for each material, and multiple material and process interactions must be understood. Resulting products may be limited by the ability of the deposited material to support itself and by the (often poor) resolution and accuracy of the process, Widespread use of additive manufacturing techniques may be limited due to the high cost associated with selective laser melting (SLM) and electron beam melting (EBM) systems. Further, most additive manufacturing devices currently in the industry use powdered metals which are thermally fused together to produce a part, but due to most metals' high thermal conductivity this approach leaves a rough surface finish because unmelted metal powder is often sintered to the outer edges of the finished product.

Challenges associated with the use of the ECAM processes in commercial systems also include the slow speed of deposition with a single anode, and small (micrometer) size of parts producible by a conventional ECAM method. Microstructures such as metal pillars have been produced using localized electrochemical deposition (LECD) process with a single anode, which is similar to ECAM, but is limited in scope to the fabrication of simple continuous features.

The stereo-electrochemical deposition (SED) process, an extension of the ECAM process, combines two technologies: stereo-lithography and electroplating. By inducing an electric field between the anode and the cathode, and passing metal salts between the electrodes, it is possible to produce metal parts at the cathode rapidly at room temperature. Since the path of the electric field is dependent on the geometry of the part being built, printing of extreme overhang angles approaching 90 degrees without the need for a support structure, is possible.

The SED process is capable of depositing most conductive materials including metals, metal alloys, conducting polymers, semiconductors, as well as metal matrix composites and nanoparticle-impregnated materials. Electroplating and electroforming techniques have established the capability of electrochemical processes to deposit metals over large areas, but localizing the deposition to a controlled area has presented a challenge.

The SED process has the potential to cheaply and quickly produce both metals and composite metal/polymer systems because it is a non-thermal process requiring relatively few moving parts and no expensive optical or high vacuum components. Additionally, the material is deposited atom by atom resulting in good micro-structural properties (such as porosity, grain size, and surface finish) which can be controlled electronically. These characteristics allow the SED process to create certain three dimensional geometries much faster, and with higher quality than conventional methods.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION OF THE INVENTION

Embodiments of the present invention relate to a controlled stereo-electrochemical deposition (SED) reactor and process performed upon a cathode to create centimeter-scale three dimensional metal objects via electrodeposition of multiple layers using an array of computer controlled anodes and a cathode. The materials are deposited layer by layer in "slices" on the cathode to produce the desired three-dimensional structures. In some embodiments the plurality of anodes are selectively movable, in other embodiments, the cathode is selectively moveable, and in other embodiments, both are moveable relative to each other.

The system for stereo-electrochemical deposition of metal objects comprises a chemical reactor, a chemical pumping and handling system, and an electrical control system. Each of these systems is described in detail below.

Figure 1:
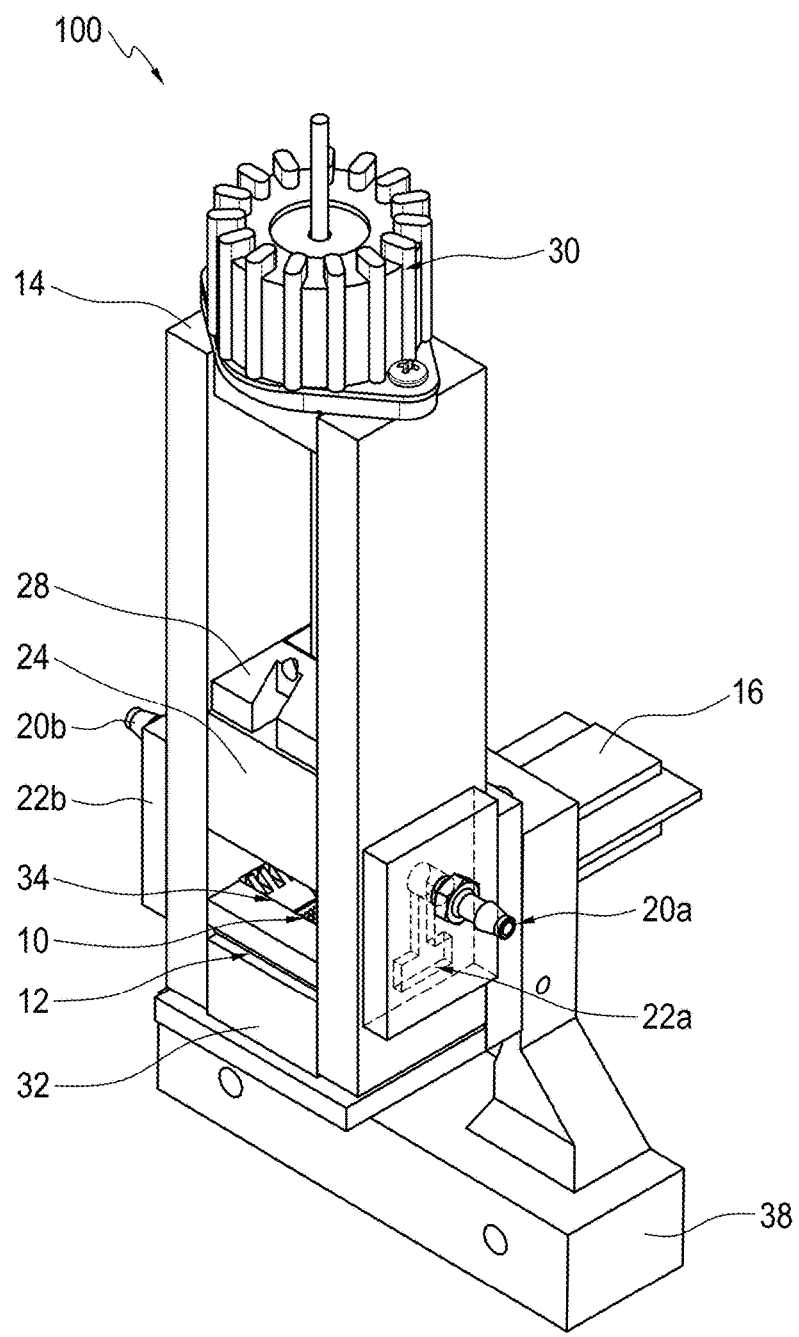
FIG. 1 is a perspective view of the reactor for stereo-electrochemical deposition of layers of metallic material to fabricate a structure.
Figure 2:
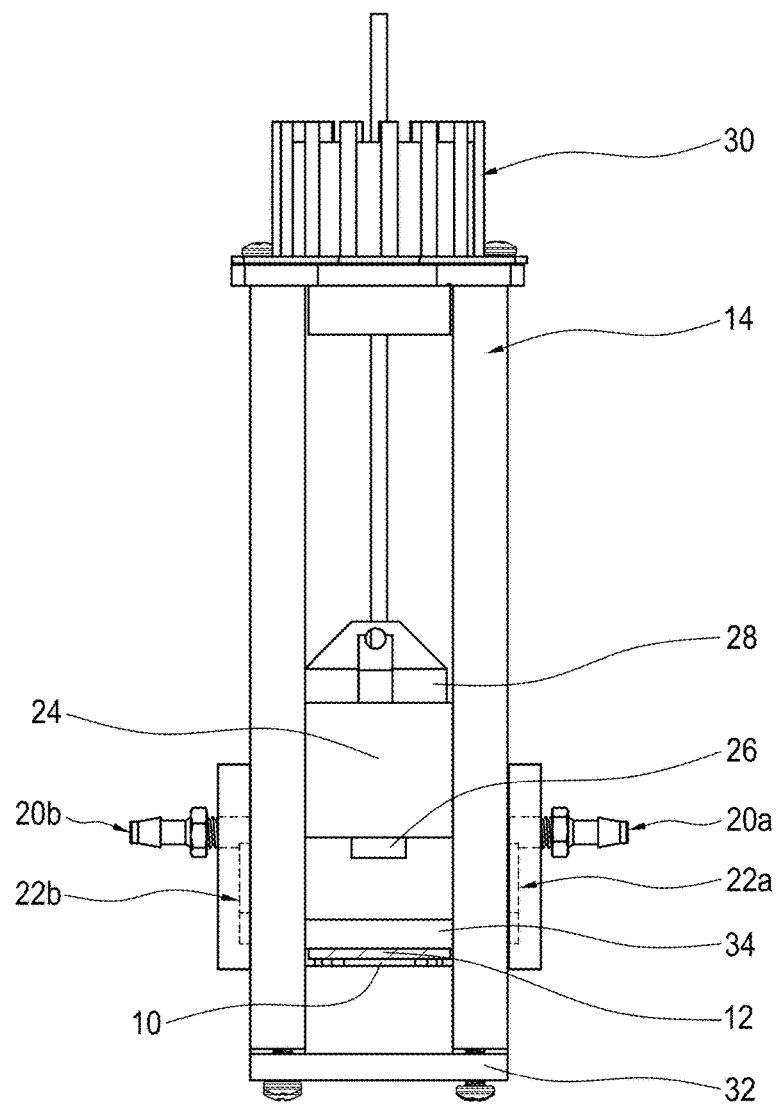
FIG. 2 is a front view of the reactor for stereo-electrochemical deposition of layers of metallic material to fabricate a structure.

FIGS. 1 and 2 illustrate an embodiment of the chemical reactor for SED of metal objects. Reactor 100 generally includes a chemical reaction chamber 14 configured to contain an electrolyte, or ionic solution, that is used for the stereo-electrochemical deposition of layers of metal to fabricate a structure. During the deposition process, electrolyte is continuously supplied to chamber 14. The electrolyte flows through chamber 14 and is collected for disposal or recycling. Chamber 14 is disposed on a structural support 38, which may be made of metal or plastic or other suitable materials known to those of ordinary skill in the art. In an embodiment, a linear actuator 30 to control the movement of cathode 26 is disposed on chamber 14 on the side opposite to where structural support 38 is located.

In one embodiment, chamber 14 is rectangular in cross-section and is made of a chemical resistant polymer material, glass, or other chemically-resistant metal, plastic or ceramic material capable of containing the solution. In an alternate embodiment, chamber 14 may be circular or another geometry in cross-section, composed of glass or an alternate chemical resistant polymer, metal or ceramic material capable of containing the solution. Persons of ordinary skill in the art would understand however that chamber 14 may have be configured according to many different designs suitable to carry out the SED process according to the invention. Conventional reactor design considerations would apply to the geometry, size and materials of construction.

Chamber 14 is provided with an inflow fluid port 20a to allow fresh electrolyte from the chemical pumping and handling system to enter chamber 14. Chamber 14 is also fitted with an outflow fluid port 20b to allow the used electrolyte to exit chamber 14 into a waste handling or recycling system (not shown). In other embodiments, chamber 14 may be fitted with a plurality of inflow fluid ports and outflow fluid ports. The inflow and outflow ports may be positioned on the same side wall of chamber 14, or they may be positioned on different side walls of chamber 14, or may be included as part of the design of the anode or the cathode assemblies.

Electrolyte from tank 59 is pumped into chamber 14 by fluid pump 52 (FIG. 6) through the inflow fluid port 20a. Fluid port 20a is disposed on a fluid flow guide 22a. In an embodiment, fluid ports connect the chamber to the rest of the chemical pumping and handling system components (pump, quick disconnect fittings, valves, tank, etc.). In an embodiment, fluid flow guide 22 is disposed on the side walls of chamber 14 to direct the flow of the electrolyte to the fluid guide vanes 34 and anode array 10.

Figure 3:
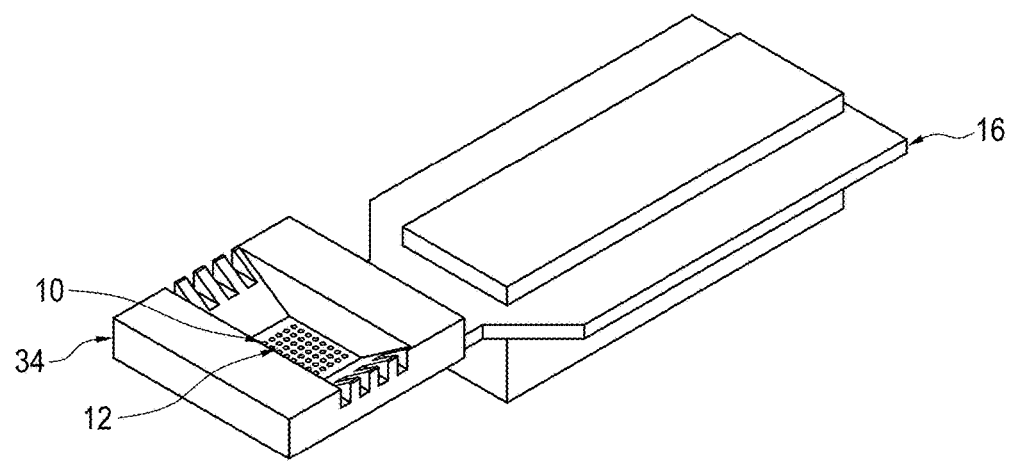
FIG. 3 is a perspective view of the anode array and the controller board of the reactor for stereo-electrochemical deposition of layers of metallic material to fabricate a structure.

As illustrated in FIG. 3, anode array 10 is disposed on fluid guide vanes 34. Anode array 10 is completely submerged in the electrolyte during the operation of the SED process. Fluid guide vanes 34 provide compressive force between the anode array 10, the gasket 12, and the anode flange 32. Fluid guide vanes 34 also direct the flow of the electrolyte over anode array 10, laminarizing the flow over the anodes to provide for even deposition of metal layers according to the invention. During the operation of the system, electrolyte is pumped into the chamber as described above, and pumped out of chamber 14 through flow guides 22b and the outflow fluid port 20b into a waste or recycling system.

As illustrated in FIG. 3, anode array 10 is positioned within fluid guide vanes 34 of chamber 14 of the reactor 100. In an embodiment, anode array 10 may have a rectangular shape with a plurality of elements that define a pattern of arrangement of the individual anode elements responsible for depositing metal layers in desired shapes. Anode array 10 may be made of a combination of plastic, ceramic, polymer, refractory or transition metal, semiconductor, carbon, and/or dielectric material. In other embodiments, array 10 may have different geometric designs to connect individual anodes in different patterns such as rectangular, circular, hexagonal, or oval. Within the anode array, multiple insulated anode conductive elements made of platinum or another conductive substance are generally disposed on and secured to the overall anode array 10. In an embodiment, each individual exposed anode element of anode array 10 is made of platinum wire.

Figure 4:
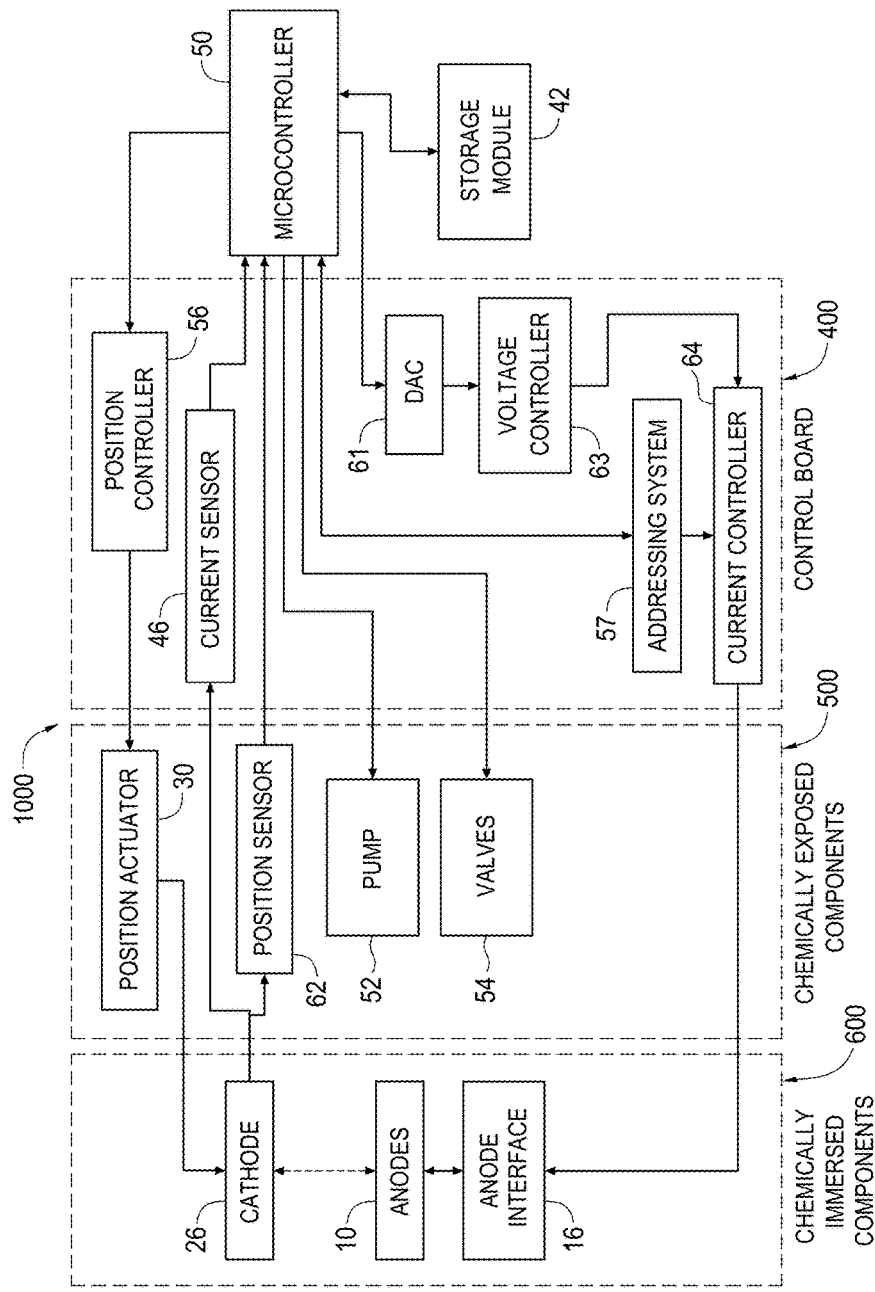
FIG. 4 is a block diagram of the components of the process of stereo-electrochemical deposition of layers of metallic material to fabricate a structure.

In FIG. 3, an anode array interface board 16 is electrically coupled to array 10 to provide electrical power to array 10 through conventional ribbon cables or other suitable connection means known in the art. Anode array interface board 16 also receives current and voltage information from cathode 26 through the current sensor 46 and the voltage controller 63 both embedded in the control board 400 (FIG. 4). Board 16 accepts electronic information as well as electrodeposition power (current) in a corresponding fashion to the anode array patterns dictated by addressing system 57 and current controller 64 respectively (FIG. 4). In other embodiments, some or all of the functions of the control board 400 may be integrated into the anode interface board 16.

In other embodiments, a printed circuit board with the same pattern of openings as anode array 10 may be used to connect each of the anode elements to a power source. In an embodiment, array 10 comprises 64 dimensionally stable platinum anodes made from 24-gauge (0.5 mm diameter) 3 mm long platinum wire, such as, for example, 95% Pt 5% Ru wire. Anode elements of the anode array 10 are secured into fitted vias in anode array interface board 16. In an embodiment, anode array interface board 16 is built on a FR4 2.0 mm thick double-sided PCB Board fabricated with 0.3 mm trace width.

As illustrated in FIGS. 1-3, gasket 12 is disposed between array 10 and fluid guide vanes 34, to contain the electrolyte in the chemical reactor and prevent leaks. In an embodiment, gasket 12 is made from a chemically resistant elastomeric polymer. In an embodiment, an anode flange 32 is disposed underneath the anode array 10. In an embodiment, anode array 10 is secured by screws on the bottom to chamber 14, and these screws are tightened to provide clamping force to compress gasket 12. In another embodiment, the clamping force is provided by other mechanical devices, such as spring tension, or a full-length threaded rod which exert force on the chamber 14 downward towards the anode array 10 to compress gasket 12 between the anode array 10 and the bottom of chamber 14. In other embodiments not shown in FIGS. 1-3, the anode array may be coupled to an electromechanical positioning system so that the position of the anode array relative to the cathode may be changed according to the desired position for the metal layer deposition step of the fabrication.

Referring again to FIGS. 1-3, a cathode 26 comprising one or more cathodic conductive materials is disposed within chamber 14 and is spaced from anode array 10. In an embodiment, cathode 26 may be disposed above anode array 10. In an embodiment, cathode 26 comprises a 9×9 mm square graphite rod with a polished anode-facing end. Cathode 26 is attached to the anode-facing surface of cathode slider 24. Cathode slider 24 mechanically fixes the position of cathode element 26 within chamber 14 during operation of the system and deposition method and houses a chemically resistant electrical connection between the cathode and control board 400. In an embodiment, cathode slider 24 is made of plastic, for example, polypropylene with an electrical contact made of chemically resistant conductive material, for example titanium, chromium-alloy, stainless steel, or carbon. A cathode slider linkage 28 connects the cathode slider 24 to the linear actuator 30 which controls the movement of cathode slider 24 within chamber 14.

In an embodiment, in which the cathode can be selectively positioned relative to the anode array, the distance between cathode 26 and anode array 10 is controlled by movement of the cathode slider 24. In an embodiment, cathode slider 24 is driven by a position actuator 30, which is controlled by a position controller 56 located on the control board 400 (FIG. 4). In an embodiment, position actuator 30 may be a non-captive leadscrew stepper motor such as, for example, Haydon Kerk Motion Solutions, Inc.'s switch and instrument stepper motor. In an embodiment, position controller 56 may be a stepper motor driver such as, for example, a Pololu Corporation's A4988 stepper motor driver. The position of cathode 26 within chamber 14 is detected through a cathode position sensor 62 (not shown) located near the top of chamber 14, and is communicated to microcontroller 50 (FIG. 4.) In an embodiment, cathode position sensor 62 may be a mechanical waterproof micro-switch such as, for example, a Yueqing Dongnan Electronics Co., Ltd. WS1 Waterproof Micro Switch 5A FIG. 4 illustrates the level of chemical exposure of various components of the SED system 1000. SED system 1000 comprises chemically exposed components module 500, chemically immersed components module 600, and a control module 400. Chemically immersed components of module 600 should be composed of engineered plastics (such as PET, PP, FEP, PTFE, certain epoxies, etc.), noble metals, certain carbon compounds, or other highly chemical resistant materials. Chemically exposed components of module 500 should be waterproof and have no exposed solder or metal parts except stainless steel. Components of the control module 400 are not exposed to chemicals and do not need to be made of chemical resistant materials.

FIG. 4 also illustrates the operation of the electrical control system 1000 which enables stereo-electrochemical deposition of layers of metallic material according to an embodiment of the invention. Control board 400 provides regulated power to all electromechanical components of the reactor for the SED process (such as the pump, the stepper motor and the stepper motor driver), as required by the software configuration of the system and the Multiple Independently Controlled Anode (MICA) algorithm.

As illustrated in FIG. 4, microcontroller 50 interfaces with a storage module 42 to receive machine configuration information and layer slice data. Storage module 42 may be a personal computer or any device capable of storing and passing layer slice data to the microcontroller 50. In an embodiment, the storage module 42 is composed of a Secure Digital card reader and card. In another embodiment, the storage module 42 is composed of a serial interface to a personal computer which delivers layer files to the microcontroller 50.

Some example computer devices include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

In an embodiment, microcontroller 50 may be an Arduino Mega microcontroller board. Microcontroller 50 receives electronic input corresponding to the position of cathode 26 from cathode position sensor 62. Microcontroller 50 receives electronic input from current sensor 46 corresponding to the total deposition current flowing through the cathode element. Using this electronic input, microcontroller 50 determines through computations whether to move the cathode, increase or decrease voltage to the anode elements, or turn various anode elements on or off in order to facilitate accurate and speedy deposition of the current layer slice.

Microcontroller 50, in an embodiment, directs the operation of the cathode z-axis position controller 56 based on information received from the current sensor 46, from the position sensor 62, and based on the active/inactive state of each anode in the addressing system 57. This information is used by the MICA software algorithm running on microcontroller 50 to determine the appropriate cathode z-axis position of cathode 26. Cathode position controller 56 controls the movement of linear actuator 30 which is mechanically linked to, and moves, cathode 26 via cathode slider linkage 28 and cathode slider 24 inside chamber 14, as was described above. (FIGS. 1 and 2).

Microcontroller 50 controls the operation of fluid pump 52 and valves 54 to direct the flow of the electrolyte solution through chamber 14 of the reactor 100. In an embodiment, valves 54 comprise electrically actuated, chemically resistant solenoid valves. In an embodiment, the fluid pumping speed may be varied at regular intervals to clear out bubbles which may have formed on the anode after a length of time of steady state deposition. In another embodiment, the fluid pumping speed may be kept at a steady rate and ultrasonic agitation may be provided into the reaction chamber 14 in order to clear out bubbles.

Anode array 10 is controlled by microcontroller 50 through an addressing system 57, which in turn supplies data to the current controller 64. The source voltage to the current controller 64 is also adjusted continuously by microcontroller 50 through a voltage controller 63 which receives an analog signal from the microcontroller 50 through the Digital-to-Analog converter (DAC) 61. According to embodiments of the invention, current controller 64 may be a NPN or PNP transistor, a Sziklai Pair compound transistor comprising one NPN transistor and one PNP transistor, a n/p-channel Field Effect Transistor (FET), or any device which has the ability to deactivate or limit the current flowing to individual anodes in the anode array when the current exceed a certain threshold limit.

In an embodiment, the addressing system 57 may be a shift register or latching circuit composed of one or more transistors, serial-in/parallel-out (SIPO), parallel-in/serial-out (PISO) or other addressing components which convert a multiplexed digital signal into a de-multiplexed digital or analog signal. In an embodiment, the voltage controller 63 may be a Linear Technologies LM317 adjustable linear voltage controller, buck, boost or single-ended primary-inductor converter (SEPIC) converter, or any adjustable voltage power supply of sufficient current capacity to supply all anode elements of anode array 10. In an embodiment, DAC 61 is composed of a LC or RC filter circuit intended to convert digital PWM signals from the microcontroller into an analog input for the voltage controller 63. In other embodiments, DAC 61 may be omitted if a digital voltage controller 63 is used.

The metal deposition model according to the present invention is derived from Faraday's first and second laws of electrolysis. The amount of chemical change produced by current at an electrode-electrolyte boundary is proportional to the quantity of electricity used. The amounts of chemical changes produced by the same quantity of electricity in different substances are proportional to their equivalent weights.

These laws can be expressed as the following formula:

$$m = \left(\frac{Q}{F}\right)\left(\frac{M}{z}\right)$$

Where m is the mass of the substance liberated at an electrode in grams; Q is the total electric charge passed through the substance; F is Faraday's constant (96485 C/mol$^{-1}$); M is the molar mass of the substance in AMU (for example, for copper this value is 63.55); z is the valence of the ions of the substance (for example, for copper (II) sulfate this value is 2).

For variable electric current deposition (as utilized by SED) Q can be defined as:

$$Q = \int_O^t I(\tau)d\tau$$

where t is the total electrolysis time, and I($\tau$) is the electric current as a function of the instantaneous time tau $\tau$. d($\tau$) is the computation time for each iteration of the algorithm.

Substituting mass for volume times density, and adding the integral charge for Q produces:

$$\rho V = \rho A d = \frac{\int_0^t I dt * M}{z * F}$$

Where $\rho$ is the density of the material (8.96 g/cm$^3$$^\wedge$3 for copper); A is the area of a single deposit on the cathode (note: this is NOT the same as the anode area) d is the distance (z-height) of the deposited column of material.

Rearranging the equation and expanding the area term results in the following equation:

$$d = \frac{\int_0^t I dt * M}{zF\rho\pi(r_{eq})^2}$$

This equation gives a model for the z-height produced at a single circular anode pin as a function of deposition current, equivalent radius of the cathode deposit, and known physical and chemical constants.

The equivalent radius of a deposit produced on the cathode, $R_{eq}$ is modeled as a function of the "throw angle" ($\lambda$), the working distance (dw) and the anode radius (r) which is approximated by the following function:

$$r_{eq} = r + d_w * \tan(\lambda)$$

According to an embodiment, the throw angle ($\lambda$) was empirically determined to best fit with observed results at 28° for a standard acid copper solution consisting of 900 g distilled water, 250 g copper sulfate pentahydrate, and 80 g sulfuric acid by weight. Those of ordinary skill will be able to determine the throw angle ($\lambda$) for other electrolytes and reactor configurations, if required.

Microcontroller 50 uses the above mathematical model to produce an overall process flow which compares the expected deposition rate on anode array 10 with the actual rate of deposition as detected by the cathode position sensor. In one embodiment, the expected deposition rate on anode array 10 is compared with the actual deposit height by "shorting" successive anodes in anode array 10 and raising the cathode to the next layer only when all anodes have been shorted. In an embodiment, the microcontroller 50 attempts to have the system for stereo-electrochemical deposition of layers of metallic materials to fabricate a structure by creating an even layer of metal deposits across each of the active anodes of anode array 10 by allowing the metal deposited material to grow from the cathode element 26 until the metal deposited material reaches anode array 10. When the metal material deposited on the cathode element contacts the anode element, the metal material will short circuit cathode to anode. The current controller 64 detects the short circuit on each individual anode of anode array 10 and limits that individual anode's current to a predetermined value, or cuts off current to that individual anode element altogether. This information is detected by microcontroller 50 through the MICA algorithm by analyzing input from the current sensor 46.

In an embodiment, the Multiple Independently Controlled Anodes (MICA) software performs the following steps:

1. Detect deposit layer height (zero the cathode);
2. Detect uneven deposits, adjust individual anode pulse-width modulation (PWM) to compensate;
3. Raise cathode to appropriate working distance;
4. Recalculate constants for new working distance and the of active anodes in the anode array;
5. Begin printing layer with n active anodes;
6. Sense total current;
7. If current is below desired amperage as predicted by model, raise voltage;
8. If current is above desired amperage, lower voltage;
9. If current derivative is above threshold (possible short), return to step 2, above;
10. If predicted deposit height exceeds threshold, return to step 1, above;
11. Otherwise, run the Ziegler-Nichols method of tuning a proportional integral derivative controller (PID controller) to maintain anode deposition current at appropriate level—return to step 6.

Figure 5:
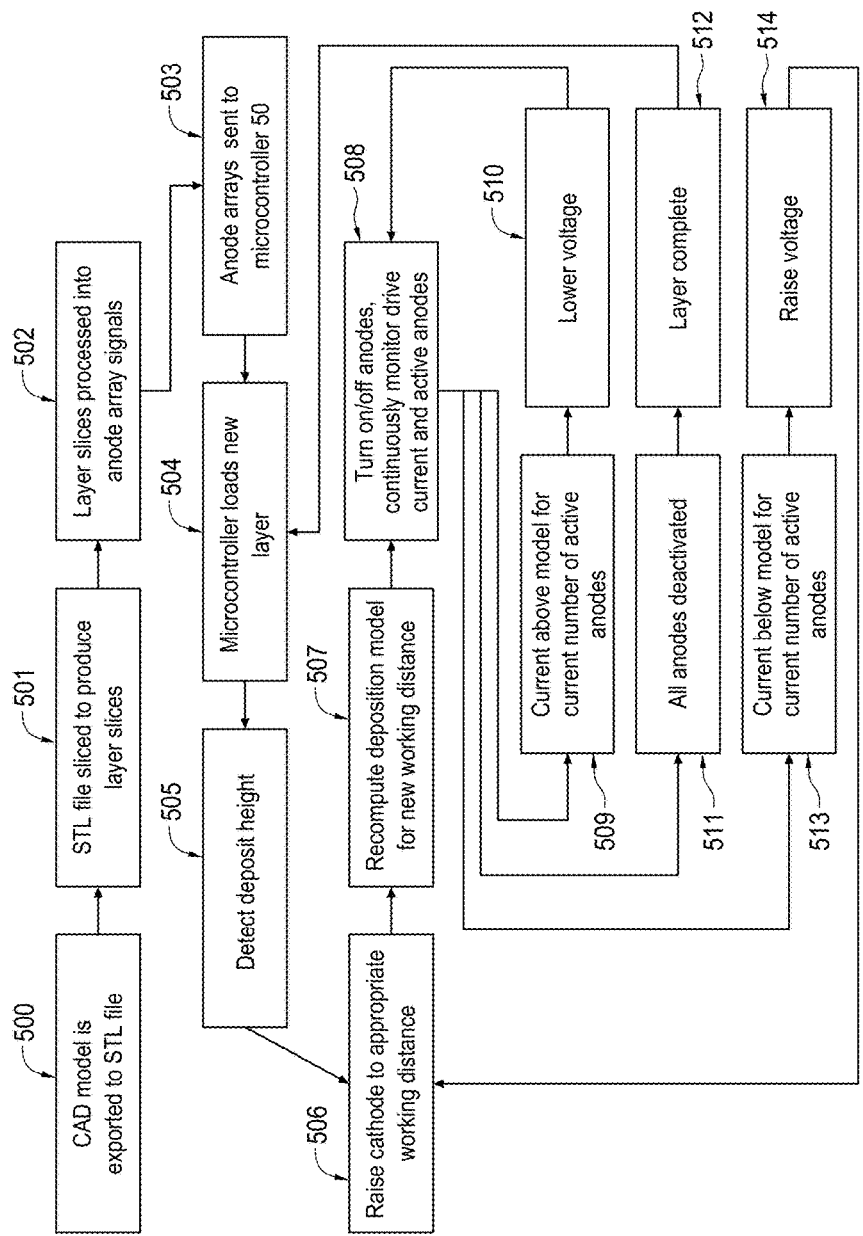
FIG. 5 is a block diagram of the process flow for stereo-electrochemical deposition of layers of metallic material to fabricate a structure.

FIG. 5 illustrates the logic flow process of the controlled stereo-electrochemical deposition according to the mathematical model described above. The overall process may be described as "deposit, verify, adjust, and repeat."

Typical process parameters for the SED process, in an embodiment, are listed below:

| Parameter | Value |
| --- | --- |
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 0.6-0.9 mm |
| Target deposition current | 1.38-6.0 mA/pin (65-285 A/dm$^2$) |

The process described above functions well for electrodeposition of two-dimensional objects and can be accomplished without any CAD, stereolithography modeling or slicing software.

However, in order to accomplish true three-dimensional (stereo)-electro deposition (SED) of functional parts, additional steps are required.

FIG. 5 depicts the process for SED of multiple layers to fabricate three dimensional structures according to an embodiment. In step 500, a CAD model of the desired product is exported to a stereolithography (STL) file. In step 501, the STL file is exported to an open source digital light projection (DLP)-based stereo-lithography (SLA) 3D printer controller (slicing) software application, to produce layer slices. In an embodiment, the slicing software may be Creation Workshop v1.0.0.13 from Envision Labs. In step 502, layer slice information is processed into anode array signals by the slicing software. Layer slice information may be output as PNG files along with a descriptive G-code file with information regarding layer width and number of slices. In step 503, anode array signals are sent to microcontroller 50. A machine configuration file (.mcf) may be created for microcontroller 50 to allow microcontroller 50 to determine the physical parameters of the controlled stereo-electrochemical deposition reactor.

In step 504, microcontroller 50 loads new layer information based on layer slices received in step 503. In step 505, microcontroller 50 detects the deposit height of cathode 26 for deposition of the new layer of metallic material. During operation of the SED process, microcontroller 50 may detect any uneven deposits of new material and adjust the overall anode bias voltage to maintain target deposition rate.

In step 506, microcontroller 50 adjusts the position of cathode 26 to an appropriate working distance from anode array 10 for deposition of the new layer of material. In step 507, microcontroller 50 computes the parameters of the operation of the SED system based upon the new position of cathode 26 determined in step 506. In step 508, microcontroller 50 causes a layer to be deposited. Microcontroller 50 continuously monitors the drive current, bias voltage and active anodes of anode array 10 to maintain overall system efficiency.

As illustrated in steps 509 and 510, if microcontroller 50 detects that the cathode current is above the target anode element amperage times the number of active anodes, voltage to entire anode array is lowered by microcontroller 50, or microcontroller 50 deactivates anode elements as needed to eliminate shorted anode elements. As illustrated in steps 513 and 514, if microcontroller 50 detects that the drive current is below the desired amperage as predicted by the model, voltage to the anode array is increased.

As illustrated in steps 511 and 512, if microcontroller 50 detects that all anodes of anode array 10 have been deactivated, the deposition of the layer is deemed complete. The process returns to step 504 for deposition of the next layer, and repeats until the structure is completed.

Figure 6:
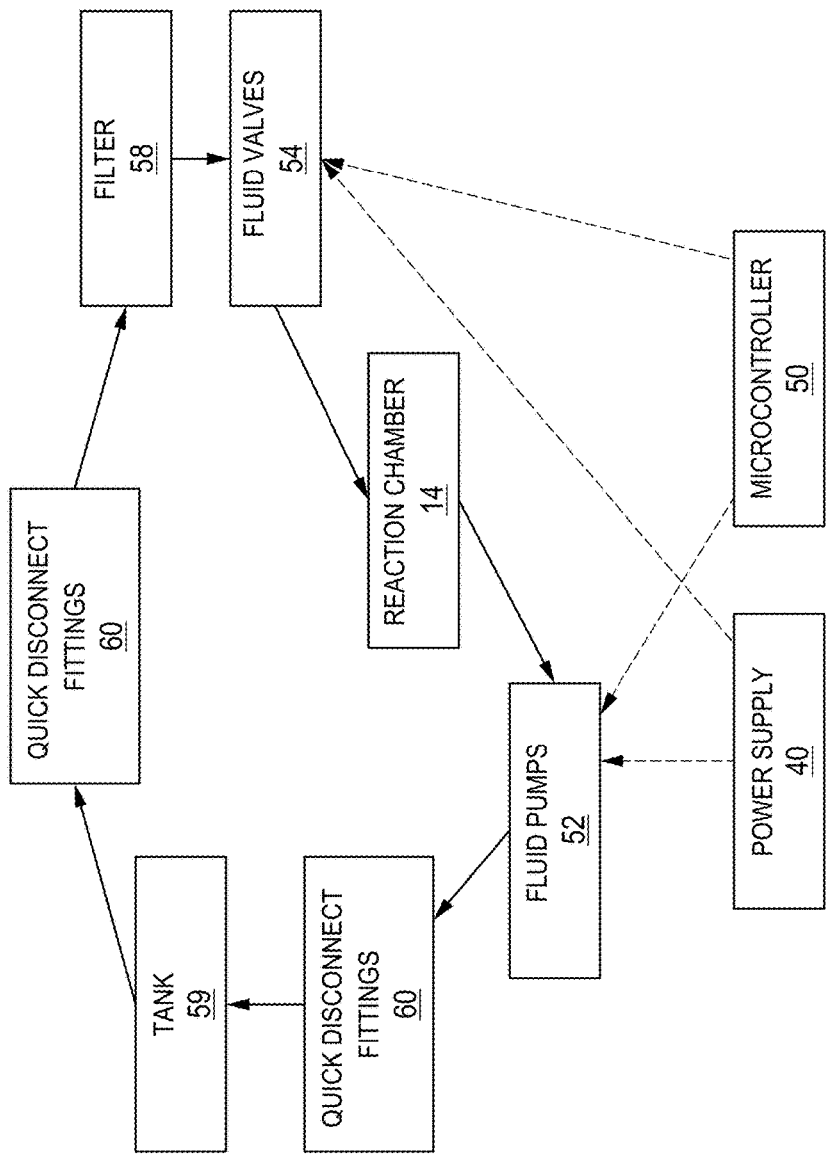
FIG. 6 is a block diagram of the chemical pumping and handling system for stereo-electrochemical deposition of layers of metallic material to fabricate a structure.

FIG. 6. illustrates an embodiment of the chemical pumping and handling subsystem which enables the stereo-electrochemical deposition process. A tank 59 is connected to the system through quick disconnect fittings 60 to route the flow of electrolyte to chamber 14 through filter 58 and valves 54. The flow of electrolyte then returns through the pump 52 and another set of quick disconnect fittings 60 and returns to the tank 59 or to a waste management system. In an embodiment, a filter 58 may be used, such as, for example, a chemical resistant polypropylene T-strainer, 200 mesh from McMaster Carr (8680T21). The electrolyte is propelled through the system by fluid pump 52 such as HYCX 10inkpump-12VDC. The flow of the electrolyte through the system is controlled using fluid valves 54, which may be chemically resistant valves, such as, for example, Parker Series 1 Miniature Inert PTFE Isolation Valves. Microcontroller 50 controls the operation of pumps 52 and valves 54. Power supply 40 provides the necessary power to run the system. In an embodiment, power supply 40 may be a Toshiba 15V 3.0 mm PA3283U-1ACA adapter/charger.

The following is a material selection guide which sets forth expected model compatibility, chemical prices, deposition rates and material properties for the various metals which could be deposited according to the embodiments of the invention:

| | Models supported | Feedstock Price ($/kg metal Ion eq.) | Deposition speed (% of Cu speed) | Electrical Conductivity (% of Cu) | Thermal Conductivity (% of Cu) | Melting Point (° C.) |
|---|---|---|---|---|---|---|
| Precious Metals | | | | | | |
| Gold | All | Spot + 20% | 25% | 65% | 83% | 1064 |
| Silver | All | Spot + 30% | 10% | 106% | 106% | 962 |
| Engineering Metals | | | | | | |
| Zinc | All | $45 | 150% | 29% | 29% | 420 |
| Zn/Fe/Co/Ni Alloys | All | $50 | 10-35% | 10-28% | 5-20% | 300-750 |
| Copper | All | $50 | 100% | 100% | 100% | 1085 |
| Nickel | A1200-2500 | $50 | 40% | 22% | 24% | 1455 |
| Tin | All | $50 | 15% | 15% | 17% | 231 |
| Pure Iron | All | $50 | 300% | 17% | 20% | 1538 |
| Stainless 316L | A1200-2500 | $60 | 5-10% | 2.5% | 4% | 1400 |
| Aluminum | A1200-2500 w/Mods | $120 | 15% | 60% | 50% | 660 |
| Titanium | A1200-2500 w/Mods | $160 | 5-20% | 4% | 5% | 1668 |
| Nonmetals and Composites | | | | | | |
| Polypyrrole | A1200-2500 | $80 | 1-2% | 0.000084% | 0.05% | 150 |
| Tungsten Carbide MMC | A2500 | $80 | 5-10% | 8% | 28% | 2800 |
| BNNT Reinforced 316L | A2500 | $850 | 4-5% | 1% | 3% | 1400 |
| SGCNT/Cu Matrix | A2500 | $550 | 90% | 140% | 110%+ | 1085 |
| Precious Metals | | | | | | |
| Gold | All | Spot + 20% | 25% | 65% | 83% | 1064 |
| Silver | All | Spot + 30% | 10% | 106% | 106% | 962 |
| Engineering Metals | | | | | | |
| Zinc | All | $45 | 150% | 29% | 29% | 420 |
| Zn/Fe/Co/Ni Alloys | All | $50 | 10-35% | 10-28% | 5-20% | 300-750 |
| Copper | All | $50 | 100% | 100% | 100% | 1085 |
| Nickel | A1200-2500 | $50 | 40% | 22% | 24% | 1455 |
| Tin | All | $50 | 15% | 15% | 17% | 231 |
| Pure Iron | All | $50 | 300% | 17% | 20% | 1538 |
| Stainless 316L | A1200-2500 | $60 | 5-10% | 2.5% | 4% | 1400 |
| Aluminum | A1200-2500 w/Mods | $120 | 15% | 60% | 50% | 660 |
| Titanium | A1200-2500 w/Mods | $160 | 5-20% | 4% | 5% | 1668 |
| Non-metals and Composites | | | | | | |
| Polypyrrole | A1200-2500 | $80 | 1-2% | $8.4 \times 10^{-7}$ | 0.05% | 150 |
| Tungsten Carbide MMC | A2500 | $80 | 5-10% | 8% | 28% | 2800 |
| C/BNNT Reinforced 316L | A2500 | $850 | 4-5% | 10-1% (variable) | 6-3% | 1400 |
| SWCNT/Cu Matrix | A2500 | $550 | 90% | 100-140% | 110%+ | 1085 |

Below is a list of potentially deposited materials and ranges of allowable, and preferred, process conditions for each deposit material, identifying the metals that can be deposited and the various reagents and additives used in the SED process for each deposit material. In the chemical compositions listed below, all compounds are assumed to be soluble in an aqueous solution:

Copper
  Allowable chemicals/concentrations:
    Copper sulfate, hexahydrous or anhydrous (0-350 g/L). Concentrations are for the hexahydrous case
    Sulfuric acid (0-270 g/L)
    Copper chloride (0-100 g/L)
    Copper Fluoroborate (0-450 g/L)
    Fluoroboric acid (0-30 g/L)
    Boric acid (0-30 g/L)
    Copper pyrophosphate (22-38 g/L) and corresponding salt: potassium or sodium pyrophosphate (150-250 g/L), as well as a source of nitrate (5-10 g/L) and ammonia ions (⅓ g/L).
    Copper cyanide (15-75 g/L) and corresponding cyanide salts or Rochelle salt.
  Allowable Additives
    benzotriazole, cadmium, casein, cobalt, dextrin, dimethylamino derivatives, disul-fides, 1,8-disulfonic acid, disodic 3,3-dithiobispropanesulfonate, 4,5-dithiaoctane-1,8 disulfonic acid, dithiothreitol, ethylene oxide, gelatin, glue, gulac, lactose benzoylhydrazone, 2-mercaptoethanol, molasses, sulfonated petroleum, o-phenanthroline, polyethoxyether, polyethylene glycol, polyethylene imine, poly N,N0-diethylsaphranin, polypropylene ether, propylene oxide, sugar, thiocarbamoyl-thio-alkane sulfonates, and thiourea.

Allowable Temperature range
  18° C.-60° C.
Allowable Voltage range
  0.2V-6V
Allowable Current range
  1.6 A/dm$^2$ to 260 A/dm$^2$
Preferred conditions for the SED process
  Electroplating solution: Copper sulfate, 250 g/L (saturated solution at room temperature). Sulfuric acid 0-40 g/L.
  Additives: Sodium dodecyl sulfate (SDS) 600 mg/L
  Temperature: 25° C. (room temperature)
  Voltage: 2.8-3.2V
  Current: 200-500 A/dm$^2$, 75% duty cycle square wave Nickel
Allowable Chemicals/concentrations:
  Nickel sulfate, hexahydrous (225-400 g/L).
  Boric acid (0-45 g/L)
  Nickel Ammonium Sulfate (0-45 g/L)
  Nickel Chloride (30-450 g/L)
  Nickel fluoroborate (0-300 g/L)
  Zinc sulfate (0-30 g/L)
  Ammonium sulfate (0-35 g/L)
  Sodium thiocyanate (0-15 g/L)
  Zinc chloride (0-30 g/L)
  Ammonium chloride (0-30 g/L)
  Phosphoric or phosphorous acid (0-50 g/L)
Allowable Additives:
  Sulfur containing compounds and surfactants
  Benzene, naphthalene and other "brighteners"
Allowable Temperature range:
  25° C.-80° C.
  Temperature control should be controlled to within +/-2° C.
Allowable Voltage range:
  0.2-1.0V, 4V possible in high frequency pulsed deposition
Allowable Current range:
  0.5-10 A/dm$^2$
Allowable Preferred conditions for the SED process
  Electroplating solution: Nickel sulfate, 240 g/L. Nickel chloride, 45 g/L. Boric acid, 30 g/L.
  Additives: Sodium dodecyl sulfate (SDS) 600 mg/L
  Temperature: 25° C. (room temperature)
  Voltage: 4V @ 75% duty cycle 100 ns pulse period
  Current: 10 A/dm$^2$ (target)

Silver
Allowable Chemicals/concentrations:
  Silver metal (0-120 g/L)
  Silver cyanide (0-150 g/L)
  Silver nitrate (0-450 g/L)
  Potassium cyanide (45-160 g/L)
  Potassium carbonate (15-90 g/L)
  Potassium nitrate (0-60 g/L)
  Potassium hydroxide (0-30 g/L)
Allowable Additives:
  Glucose, tartaric acid, Rochelle salt, ethyl alcohol, potassium nitrate, hydrazine, hydrazine sulfate, ammonia, ethylenediamine, 3,5-diiodotyrosine, Na-2-3-mercaptopropane sulfonate, and other "stabilizers".
Allowable Temperature range:
  25° C.-50° C.
Allowable Voltage range:
  4-6V (strike voltage), 0.1-2V plating voltage, pulse deposition may be possible
Allowable Current range:
  0.5-10 A/dm$^2$
Preferred conditions for the SED process (process may be modified to reduce cyanides due to their toxicity)
  Electroplating solution: Silver nitrate or silver cyanide-based solution.
  Additives: Sodium dodecyl sulfate (SDS) 600 mg/L, other additives TBD
  Current: 10 A/dm$^2$ (target)

Zinc
Allowable Chemicals/concentrations:
  Zinc cyanide (0-60 g/L)
  Sodium cyanide (0-40)
  Sodium hydroxide (0-80 g/L)
  Sodium bicarbonate/carbonate (0-15 g/L)
  Sodium sulfide (0-2 g/L), catalytic
  Zinc chloride (0-130 g/L)
  Nickel chloride (0-130 g/L)
  Potassium chloride (0-230 g/L)
Allowable Additives:
  Thiosemicarbazide and their thiosemicarbazone derivatives such as Thiosemicarbazide (TSC), Acetophenone (AcP), Cinnamaldehyde (CnA), Crotonaldehyde (CrA), Furfuraldehyde (FrA), Salcylaldehyde (SaA), Acetophenonethiosemicarbazone (ApTSCN), Cinnamaldehydethiosemicarbazone (CnTSCN), Crotonaldehydethiosemicarbazone (CrTSCN), Furfuraldehydethiosemicarbazone (FrTSCN), Salcylaldehyde thiosemicarbazone (SaTSCN)
  (a) poly(N-vinyl-2-pyrrolidone), and p0 (b) at least one sulfur-containing compound selected from compounds of the formulae: RS(R'O)n H (I) or S—[(R'O)n H]2 (II)
  Polyvinyl alcohols, polyethyleneimine, gelatin and peptone
Allowable Temperature range:
  25° C.-40° C.
Allowable Voltage range:
  3-18V (strike voltage), pulse deposition may be possible
Allowable Current range:
  0.1-50 A/dm$^2$
Preferred conditions for the SED process (will not deposit pure zinc due to toxicity and difficulty of using DSA anode tech-instead will attempt deposit zinc/nickel alloys)
  Electroplating solution: Zinc chloride, 120 g/L. Nickel chloride 120 g/L. Potassium chloride, 230 g/L
  Additives: Sodium dodecyl sulfate (SDS) 600 mg/L, polyvinyl alcohol MW 5 k-20 k Dalton, as well as polyethyleneimine, gelatin and peptone, 0.1-3 g/L.
  Temperature: 25° C. (room temperature)
  Current: 5 A/dm$^2$ (target)

Iron and ferrous alloys
Allowable Chemicals/concentrations (for iron metal):
  Iron sulfate (0-300 g/L) or Iron ammonium sulfate
  Ammonium sulfate (0-120 g/L)
  Ferrous chloride (0-300 g/L)
  Calcium chloride (0-335 g/L)
  Potassium chloride (0-180 g/L)
  Ammonium chloride (0-20 g/L)
  Iron fluoroborate (0-226 g/L)
  Sodium chloride (0-10 g/L)

Allowable Chemicals/concentrations (for selected stainless steel alloys),
  Iron sulfamate, Cobalt sulfamate, ammonium metavanadate, boric acid, sodium tetraborate, ascorbic acid, saccharin, SDS, potassium dichromate (~300 g/L), nickel sulfate (~80 g/L), Iron sulfate (~50 g/L), Glycine (~150 g/L)
Allowable Chemicals/concentrations (for selected high-toughness boron steel alloy)
  Ferrous chloride (~200 g/L)
  Malic acid (0.6 g/L)
  Boric acid (40 g/L)
  Dimethylamineborane (3 g/L)
Allowable Additives:
  SDS
  1 g/L of condensate of sodium naphthalene sulfonate and formaldehyde
Allowable Temperature range:
  25° C.-110° C.
Allowable Current range:
  1-400+ A/dm$^2$
Preferred conditions for the SED process (iron chloride baths will be avoided due to the tendency for ferric chlorides to form, and due to the extremely corrosive nature of the chloride plating solutions)
  Electroplating solution: Iron fluoroborate (225 g/L), Sodium chloride (0-10 g/L). Boron-alloy and stainless solutions may be pursued at a later date
  Additives: Sodium dodecyl sulfate (SDS) 600 mg/L, 1 g/L of condensate of sodium naphthalene sulfonate and formaldehyde
  Temperature: >50° C. (target)
  Current: 10 A/dm$^2$ (target)
  Working distance: TBD (suspected to be around the same distance as the radius/half width of the anode)
Aluminum
  May employ ionic liquids, aluminum chlorides, aluminum chloride-butylpyridinium chlorides (BPC), aluminum chloride-trimethylphenylammonium chloride (TMPAC) and/or aluminum flourobororides
  Deposition potential likely ~0.4-1.0V
Polymer deposition and polymer matrix composites (PMC)
  Allowable Chemicals/concentrations (for iron metal):
    Polyaniline
    Polypyrrole (monomer 3 g/L)
    polythiophene
    polyphenylenevinylene
    Acetonitrile
    Methanol
    Oxcalic acid
    Sodium salicylate
  Allowable Additives:
    Lithium perchlorate (as a catalyst for deposit adhesion), Tiron (0.05 M)
  Allowable Voltage range:
    0.4-1.0V
  Allowable Current range:
    0.1 A/dm$^2$
  Preferred conditions for the SED process
    Electroplating solution: Pyrrole, 3 g/L. Lithium perchlorate, concentration TBD. Tiron (15.7 g/L), composite materials may be added to the electroplating bath such as: single walled or multi-walled functionalized carbon nanotubes, silica fibers, aerogels, or amorphous powders, boron, boron nitride, silicon carbide, or other high strength ceramic materials, graphene or graphene oxide, etc.
    Additives: Sodium dodecyl sulfate (SDS) 600 mg/L, 1 g/L of condensate of sodium naphthalene sulfonate and formaldehyde.
    Dopants: Tosyl chloride, tosylic acid.
    Temperature: >50° C. (target), max temp will depend on chamber construction mats.
Metal matrix composites (MMC)
  Allowable Chemicals/concentrations:
    All allowable chemicals and concentrations listed in the specification. Functionalized/solvated nanomaterials or high strength ceramic fibers such as: single walled or multi-walled functionalized carbon nanotubes, silica fibers, aerogels, or amorphous powders, boron, boron nitride, silicon carbide, or other high strength ceramic materials, graphene or graphene oxide, etc.
    Multi-walled carbon nanotubes (MWNTs) may be added in concentrations as high as 4 g/L
  Allowable Additives:
    Polycyclic acid, MHT, Polyacrylic acid, SDS
  Allowable Voltage range:
    0.4-5.0V
  Allowable Current range:
    0.1 A/dm$^2$
  Preferred conditions for the SED process
    Electroplating solution: Pyrrole, 3 g/L. Lithium perchlorate, concentration TBD. Tiron (15.7 g/L), composite materials may be added to the electroplating bath such as: single walled or multi-walled functionalized carbon nanotubes, silica fibers, aerogels, or amorphous powders, boron, boron nitride, silicon carbide, or other high strength ceramic materials, graphene or graphene oxide, etc.
    Additives: Sodium dodecyl sulfate (SDS) 600 mg/L, 1 g/L of condensate of sodium naphthalene sulfonate and formaldehyde Temperature: >50° C. (target), max temp will depend on chamber construction mats.
Below is a list of electrolytes which may be used to carry the metal, semimetal and electroconductive monomer ions:
  Water
    Allowable temperatures: 18° C.-95° C.
    Allowable voltage range: 0.2-7.2V
    Allowable current range: 0.1-1000 A/dm$^2$
    Potentially deposited materials: All potentially deposited materials listed in the specification, in addition to Al, Pd, In, Sb, Te, Ga, Si, Ta, and Ti, as well as Metal Matrix Composites (MMC) and codeposited Polymer Matrix Composites (PMC).
  Ionic liquids
    Based on: Ethyl ammonium nitrate, alkyl-pyridinium chloride, 2-hydroxy-N,N,N-trimethylethanaminium, dimethylsulfoxide, or alkyl-arylimidazolium.
    Containing an anion group such as: Hexafluorophosphate, Bis(trifluoromethylsulfonyl) amide, Trispentafluoroethyltrifluorophosphate, Trifluoroacetate, Trifluoromethylsulfonate, Dicyanoamide, Tricyanomethide, Tetracyanoborate, Tetraphenylborate, Tris(trifluoromethylsulfonyl)methide, Thiocyanate, Chloride, Bromide, Tetrafluoroborate, Triflate, etc.
    Containing a cation groups such as: Choline, Pyrrolidinium, Imidazolium, Pyridinium, Piperidinium, Phosphonium (including Tri-hexyl-tetradecylphosphonium), Pyrazolium, Ammonium, Sulfonium, etc.
    Allowable temperatures: 0° C.-300° C.
    Allowable voltage range: 0.2-7.2V Allowable current range: 0.1-1200 A/dm$^2$ Potentially deposited materials: All listed in 0095, in addition to Al, Pd, In, Sb, Te, Ga, Si, Ta, Mg, and Ti, as well as Metal Matrix Composites (MMC) and codeposited Polymer Matrix Composites (PMC).

Figure 7A:
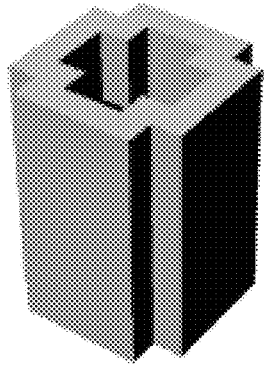
FIG. 7A is a 3D model of a structure to be fabricated by stereo-electrochemical deposition of layers of metallic material.

FIG. 7A illustrates a 3D model of a structure to be fabricated by stereo-electrochemical deposition of layers of copper performed under the following conditions:

| Parameter | Value |
|---|---|
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 0.65 mm |
| Target deposition current | 5.0 mA per pin |

Figure 7B:
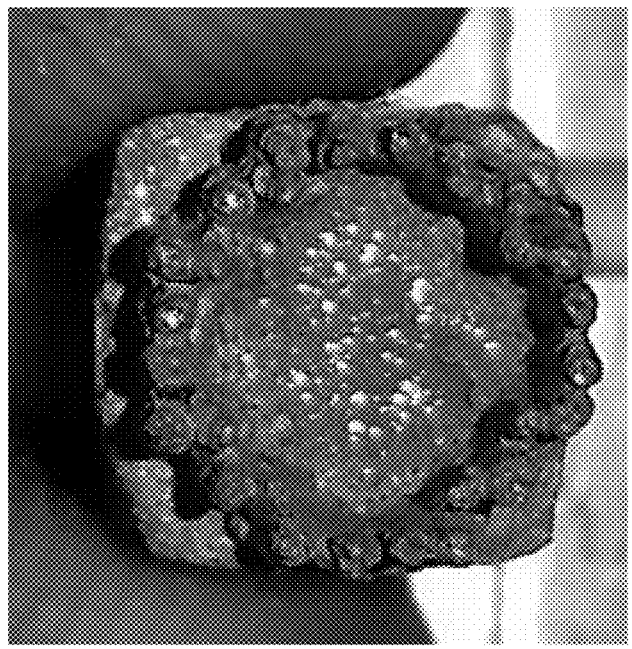
FIG. 7B is a top view of a structure fabricated by stereo-electrochemical deposition of layers of metallic material.

FIG. 7B is a top view of a structure fabricated by stereo-electrochemical deposition of layers of copper for 6 hours under the conditions described above.

Figure 7C:
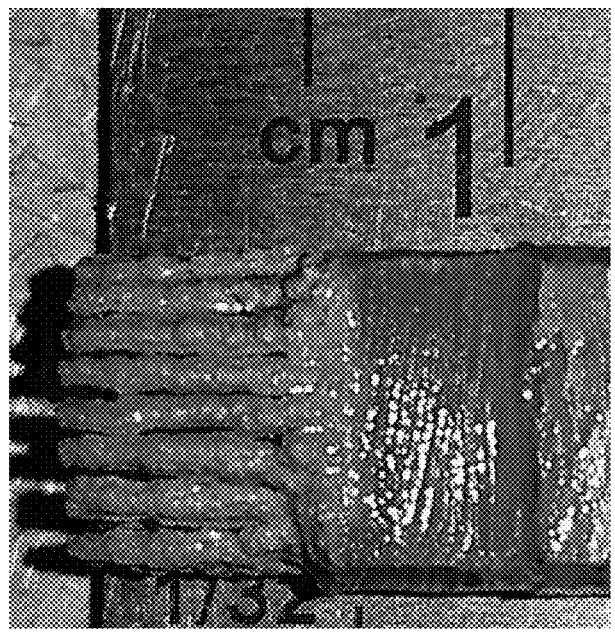
FIG. 7C is a side view of a structure fabricated by stereo-electrochemical deposition of layers of metallic material.

FIG. 7C is a side view of a structure fabricated by stereo-electrochemical deposition of layers of copper for 6 hours under the conditions described above.

Figure 8A:
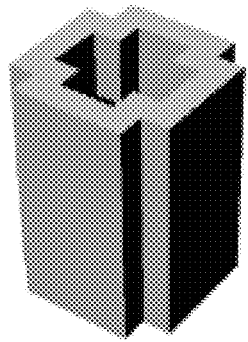
FIG. 8A is a 3D model of a structure to be fabricated by stereo-electrochemical deposition of layers of metallic material.

FIG. 8A illustrates a 3D model of a structure to be fabricated by stereo-electrochemical deposition of layers of copper performed under the following conditions:

| Parameter | Value |
|---|---|
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 0.7 mm |
| Target deposition current | 5.2 mA per pin |

Figure 8B:
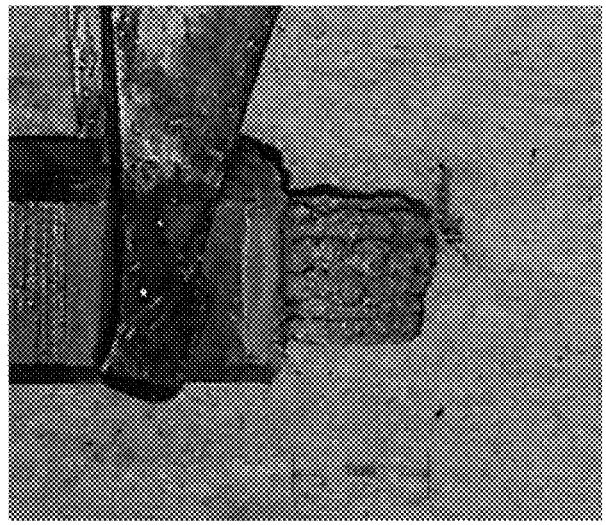
FIG. 8B is a side view of a structure fabricated by stereo-electrochemical deposition of layers of metallic material.

FIG. 8B is a side view of a structure fabricated by stereo-electrochemical deposition of layers of copper for 8 hours under the conditions described above.

Figure 8C:
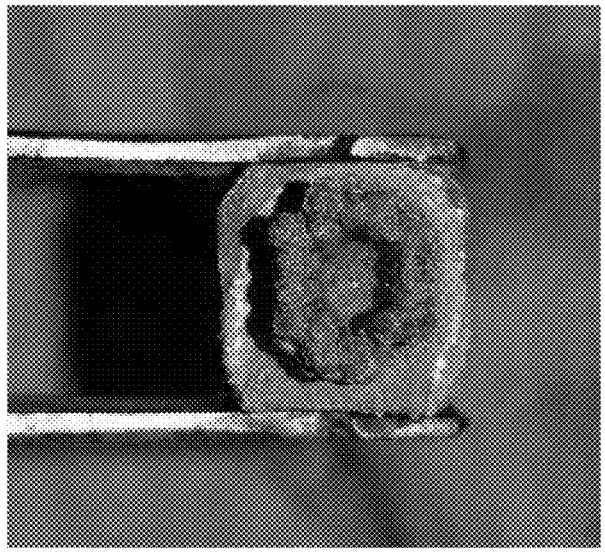
FIG. 8C is a top view of a structure fabricated by stereo-electrochemical deposition of layers of metallic material.

FIG. 8C is a top view of a structure fabricated by stereo-electrochemical deposition of layers of copper for 8 hours under the conditions described above.

Figure 9A:
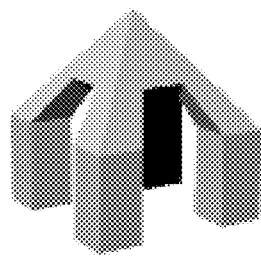
FIG. 9A is a 3D model of a structure to be fabricated by stereo-electrochemical deposition of layers of metallic material.

FIG. 9A illustrates a 3D model of a structure to be fabricated by stereo-electrochemical deposition of layers of copper performed under the following conditions:

| Parameter | Value |
|---|---|
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 0.86 mm |
| Target deposition current | 2.1 mA per pin |

Figure 9B:
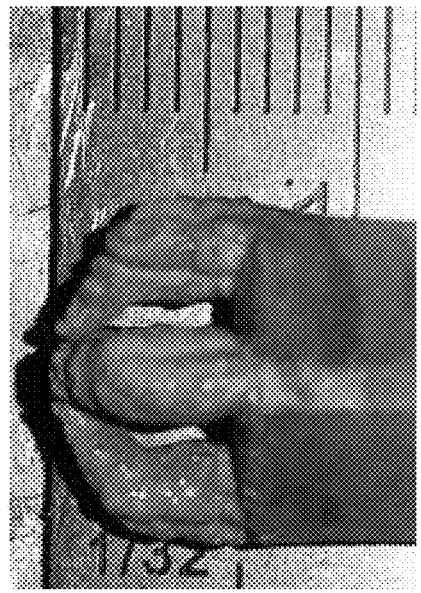
FIG. 9B is a side view of a structure fabricated by stereo-electrochemical deposition of layers of metallic material.

FIG. 9B is a side view of a structure fabricated by stereo-electrochemical deposition of layers of copper for 50 hours under the conditions described above.

Figure 9C:
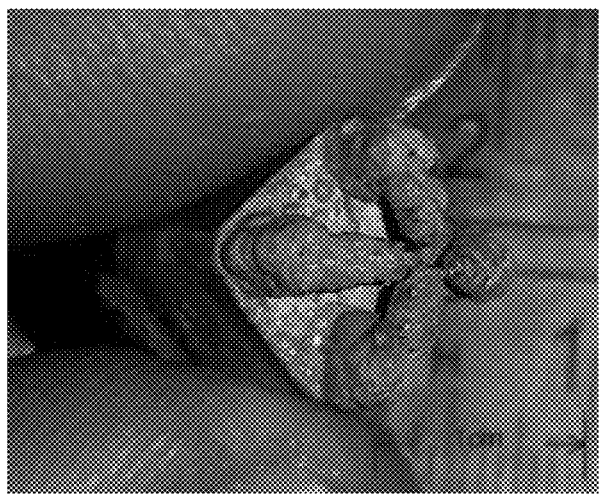
FIG. 9C is a top view of a structure fabricated by stereo-electrochemical deposition of layers of metallic material.

FIG. 9C is a top view of a structure fabricated by stereo-electrochemical deposition of layers of copper for 50 hours under the conditions described above.

Figure 10A:
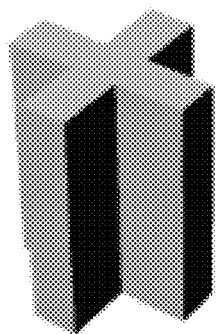
FIG. 10A is a 3D model of a structure to be fabricated by stereo-electrochemical deposition of layers of metallic material.

FIG. 10A illustrates a 3D model of a structure to be fabricated by stereo-electrochemical deposition of layers of copper performed under the following conditions:

| Parameter | Value |
|---|---|
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 1 mm |
| Target deposition current | 3.1 mA per pin |

Figure 10B:
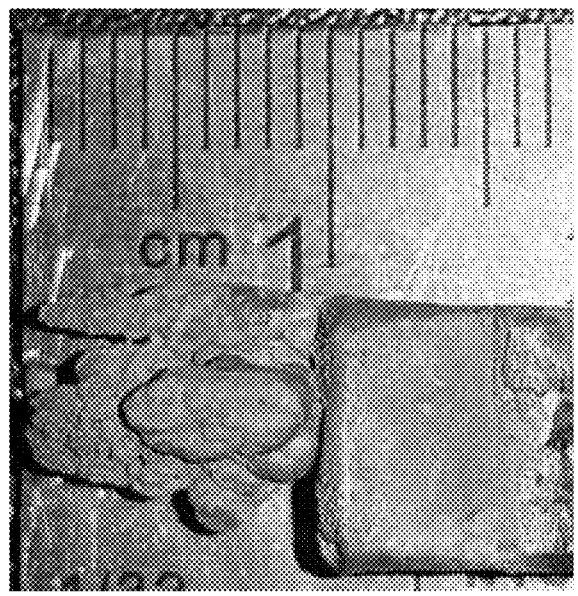
FIG. 10B is a side view of a structure fabricated by stereo-electrochemical deposition of layers of metallic material.

FIG. 10B is a side view of a structure fabricated by stereo-electrochemical deposition of layers of copper for 97 hours under the conditions described above.

Figure 10C:
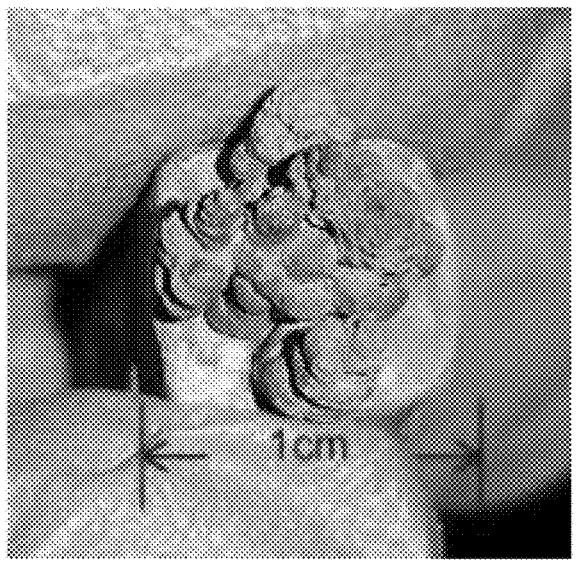
FIG. 10C is a top view of a structure fabricated by stereo-electrochemical deposition of layers of metallic material.

FIG. 10C is a top view of a structure fabricated by stereo-electrochemical deposition of layers of copper for 97 hours under the conditions described above.

Figure 11A:
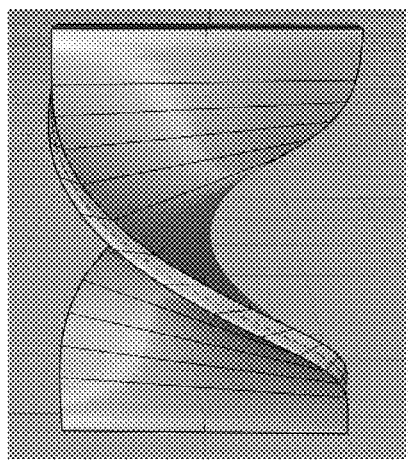
FIG. 11A is a 3D model of a structure to be fabricated by stereo-electrochemical deposition of layers of metallic material.

FIG. 11A illustrates a 3D model of a structure to be fabricated by stereo-electrochemical deposition of layers of copper performed under the following conditions:

| Parameter | Value |
|---|---|
| Voltage | Dynamically adjusted via Zieglar-Nichols PID (1.8-3.8 V) |
| Pulse period | DC |
| Electrolyte | Copper sulfate hexahydrate (250 g), Sulfuric acid (80 g), water (900 g) |
| Anode | 64 Pt—Ru (95/5) pins (0.5 mm diameter) |
| Cathode | 9 mm × 9 mm graphite block |
| Working distance | 0.8 mm |
| Target deposition current | 2.6 mA per pin |

Figure 11B:
FIG. 11B is a side view of a structure fabricated by stereo-electrochemical deposition of layers of metallic material.

FIG. 11B is a side view of a structure fabricated by stereo-electrochemical deposition of layers of copper for 110 hours under the conditions described above.

Figure 11C:
FIG. 11C is a side view of a structure fabricated by stereo-electrochemical deposition of layers of metallic material.

FIG. 11C is a side view of a structure fabricated by stereo-electrochemical deposition of layers of copper for 110 hours under the conditions described above.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

We claim:
1. An apparatus comprising:
a reaction chamber configured to retain an electrolyte;
an anode array containing a plurality of anodes stationary with respect to one another, the anode array disposed in the reaction chamber and configured to be immersed in the electrolyte such that the plurality of anodes are in fluid contact with one another through the electrolyte, and such that the plurality of anodes cause a deposition of a unitary layer structure or a series of unitary layer structures;

a cathode disposed in the reaction chamber and configured such that the cathode is in fluid and in contact with the plurality of anodes through the electrolyte;

a system for electro-mechanically positioning either the anode array the cathode, or both to control the distance between the anode array and the cathode;

at least one sensor for individually measuring an electrical current and or voltage of one of the plurality of anodes; and a microcontroller, coupled to the system for electro-mechanically positioning either the anode array, the cathode, or both, coupled to the at least one sensor, and coupled to a source of layer slice information, programmed with instructions that when executed by the microcontroller cause the microcontroller to:

(i) control the current or voltage applied to each anode of the plurality of anodes; and (ii) control the electro-mechanical positioning of the anode array, or the cathode, or both to control the distance between the anode array and the cathode during an electrochemical deposition to cause the deposition of the unitary layer structure or the series of unitary layer structures.

2. The apparatus of claim 1, wherein the anode array has a geometrical shape that is chosen from the group consisting of hexagonal, rectangular, square, or circular geometrical shapes.

3. The apparatus of claim 2, wherein the anode array is constructed upon a printed circuit board, doped or undoped semiconductor, or other means of separating conductive elements from one another and aligning them in a predetermined pattern.

4. The apparatus of claim 2, wherein the anode array is connected electrically to, or disposed upon an integrated circuit, semiconductor, or combination of conductive and insulative elements meant for biasing the plurality of anodes.

5. The apparatus of claim 1, wherein each of the anodes in the anode array has an exposed surface having a geometric shape chosen from the group consisting of a hexagon, a rectangle, a triangle, a square, or a circle.

6. The apparatus of claim 1, wherein the anode array is arranged in rows.

7. The apparatus of claim 1, wherein each of the anodes in the anode array is insulated from one another and is biased individually.

8. The apparatus of claim 1, wherein each of the anodes in the anode array is insulated from one another and the anodes are biased in groups.

9. The apparatus of claim 1, wherein each of the anodes in the anode array is constructed out of a material resistant to physical depletion through electrolysis.

10. The apparatus of claim 1, wherein the electro-mechanical positioning system includes an actuator and a control system in communication with the microcontroller.

11. In a reaction chamber configured to retain an electrolyte, the reaction chamber having an anode array containing a plurality of anodes stationary with respect to one another, and a cathode disposed in the reaction chamber such that the plurality of anodes and the cathode are all in fluid contact through the electrolyte, a method comprising:

a) at a microcontroller programmed with instructions that when executed by the microcontroller cause the microcontroller to control the current or voltage applied to each anode of the plurality of anodes as defined by layer slice information about a structure to be fabricated layer by layer in the reaction chamber;

b) under the control of the microcontroller, providing to the reaction chamber the electrolyte containing metal ions to be deposited on the cathode;

c) under the control of the microcontroller, adjusting the distance between the anode array and the cathode;

d) under the control of the microcontroller, processing the layer slice information for the layer to be fabricated, depositing the layer to be fabricated on the cathode by providing current or voltage to the anode array thereby causing an electrochemical reaction at the cathode;

e) individually monitoring the electrical current and or voltage at one of the plurality of anodes to detect when the deposit reaches a target layer thickness at each anode to cause a uniform layer deposit; and f) repeating steps (a) through (e) for each layer of the structure to be fabricated until all layers are deposited.

12. The method of claim 11, wherein adjusting the relative position of the anode array and the cathode includes moving the anode array relative to the cathode by using an electro-mechanical positioning system under control of the microcontroller.

13. The method of claim 11, wherein adjusting the relative position of the anode array and the cathode includes moving the cathode relative to the anode array by using an electro-mechanical positioning system under control of microcontroller.

14. The method of claim 11, wherein adjusting the relative position of the anode array and the cathode includes moving both the cathode and the anode array by using an electro-mechanical positioning system under control of the microcontroller.

15. The method of claim 11, wherein depositing the layer to be fabricated on the cathode includes depositing at least one material selected from group consisting of gold, silver, zinc, Zn/Fe/Co/Ni alloys, copper, nickel, tin, iron, stainless steel, aluminum, titanium, polypyrrole, silicon, tungsten carbide MMC, PMC, BNNT Reinforced 316L, and SWCNT/Cu matrix.

16. The method of claim 11, wherein the temperature of the electrolyte is maintained between 0° C. and 300° C.

17. The method of claim 11, wherein the current applied to the anode array is maintained between $0.1 A/dm^2$ and $1200 A/dm^2$.

18. The method of claim 11, wherein the voltage applied between any single anode and the cathode is maintained between 0.2 V and 7.2 V.

19. The method of claim 11, wherein repeating steps (a) through (e) includes repeated deposits of the same material.

20. The method of claim 11, wherein repeating steps (a) through (e) includes depositing a different material than the first deposition at least once.

* * * * *